(12) United States Patent
Tran et al.

(10) Patent No.: US 10,942,941 B2
(45) Date of Patent: Mar. 9, 2021

(54) NATURAL LANGUAGE PROCESSOR FOR COGNITIVELY GENERATING CONTEXTUAL FILLER DESIGNED TO KEEP USERS ENGAGED

(71) Applicant: INTERNATIONAL BUSINESS MACHINES CORPORATION, Armonk, NY (US)

(72) Inventors: Khoi-Nguyen Dao Tran, Southbank (AU); Shaila Pervin, Docklands (AU); Jason Jingshi Li, Yarralumla (AU); Mukesh Kumar Mohania, Waramanga (AU); Jey Han Lau, Melbourne (AU); Will Dubyak, Boerne, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 128 days.

(21) Appl. No.: 16/186,920

(22) Filed: Nov. 12, 2018

(65) Prior Publication Data
US 2020/0151274 A1    May 14, 2020

(51) Int. Cl.
*G06F 16/00* (2019.01)
*G06F 16/248* (2019.01)
(Continued)

(52) U.S. Cl.
CPC ......... *G06F 16/248* (2019.01); *G06F 9/547* (2013.01); *G06F 16/243* (2019.01);
(Continued)

(58) Field of Classification Search
CPC ................ G06F 16/248; G06F 16/243; G06F 16/24575; G06F 9/547
See application file for complete search history.

(56) References Cited

U.S. PATENT DOCUMENTS 7,050,569 B1 *  5/2006  Weaver ............... H04M 3/5166
                                         379/266.01
8,879,703 B1 * 11/2014  Lavian ................. H04M 3/493
                                         379/201.01
(Continued)

FOREIGN PATENT DOCUMENTS

CN      106182007 A    12/2016
WO    2018063758 A1     4/2018

OTHER PUBLICATIONS

Pfeifer, et al., "Should Agents Speak Like, um, Humans? The Use of Conversational Fillers by Virtual Agents," Northeastern University College of Computer and Information Science: (Sep. 2009); 7 pages.

*Primary Examiner* — Khanh B Pham
(74) *Attorney, Agent, or Firm* — Cantor Colburn LLP; Joseph Petrokaitis

(57) ABSTRACT

A computer-implemented method includes detecting, using a processor system, a first delay in a conversation system. Initial contextual data is received at a first orchestration layer of the processor system, where the initial contextual data describes a context of a user. The first orchestration layer queries a first data source, based on the initial contextual data. Based on querying the first data source, the first orchestration layer augments the initial contextual data to determine updated contextual data describing the context of the user. Filler content personalized to the user is generated based on the updated contextual data describing the context of the user. The filler content is presented through a user interface during the first delay, responsive to detecting the first delay in the conversation system.

14 Claims, 5 Drawing Sheets

(51) Int. Cl.
*G06F 9/54* (2006.01)
*G06N 3/08* (2006.01)
*G06N 3/04* (2006.01)
*G06F 16/242* (2019.01)
*G06F 16/2457* (2019.01)

(52) U.S. Cl.
CPC ..... *G06F 16/24575* (2019.01); *G06N 3/0427* (2013.01); *G06N 3/0445* (2013.01); *G06N 3/0454* (2013.01); *G06N 3/08* (2013.01)

(56) References Cited

U.S. PATENT DOCUMENTS

| | | |
|---|---|---|
| 9,537,924 B2 | 1/2017 | Barnett |
| 2004/0174980 A1* | 9/2004 | Knott .................. H04M 3/5166 379/266.01 |
| 2008/0205620 A1* | 8/2008 | Odinak ............... H04M 3/5238 379/215.01 |
| 2009/0041209 A1 | 2/2009 | Agapi |
| 2012/0328088 A1* | 12/2012 | Dyer ..................... G06Q 30/02 379/88.22 |

\* cited by examiner ically designed to keep users engaged.

NATURAL LANGUAGE PROCESSOR FOR COGNITIVELY GENERATING CONTEXTUAL FILLER DESIGNED TO KEEP USERS ENGAGED

BACKGROUND

The present invention relates to automated conversation systems and, more specifically, to computing systems that use natural language processing (NLP) to generate contextual filler cognitively designed to keep users engaged.

Natural language processing refers to a suite of computer-based tools that draw on the fields of computer science, artificial intelligence, or computational linguistics to manage interactions between computers and humans using natural languages. NLP systems are related to the area of human-computer interaction. Among the challenges in implementing NLP systems is enabling computers to derive meaning from natural language inputs, such as speech, as well as the effective and efficient generation of natural language outputs.

SUMMARY

Embodiments of the present invention are directed to a computer-implemented method for generating contextual filler content. A non-limiting example of the computer-implemented method includes detecting, using a processor system, a first delay in a conversation system. Initial contextual data is received at a first orchestration layer of the processor system, where the initial contextual data describes a context of a user. The first orchestration layer queries a first data source, based on the initial contextual data. Based on querying the first data source, the first orchestration layer augments the initial contextual data to determine updated contextual data describing the context of the user. Filler content personalized to the user is generated based on the updated contextual data describing the context of the user. The filler content is presented through a user interface during the first delay, responsive to detecting the first delay in the conversation system.

Embodiments of the present invention are directed to a system for generating contextual filler content. A non-limiting example of the system includes a filler manager, a first orchestration layer, and a content generator. The filler manager is configured to detect a first delay in the conversation system. The first orchestration layer is configured to receive initial contextual data, where the initial contextual data describes a context of a user. The first orchestration layer queries a first data source based on the initial contextual data. Additionally, the first orchestration layer augments the initial contextual data to determine updated contextual data describing the context of the user, based on querying the first data source. The content generator is configured to generate filler content personalized to the user, based on the updated contextual data describing the context of the user. The filler manager is further configured to present the filler content through a user interface during the first delay, responsive to detecting the first delay in the conversation system.

Embodiments of the invention are directed to a computer-program product for generating contextual filler content, the computer-program product including a computer-readable storage medium having program instructions embodied therewith. The program instructions are executable by a processor to cause the processor to perform a method. A non-limiting example of the method includes detecting a first delay in a conversation system. Further according to the method performed by the processor, initial contextual data is received at a first orchestration layer, where the initial contextual data describes a context of a user. The first orchestration layer queries a first data source, based on the initial contextual data. Based on querying the first data source, the first orchestration layer augments the initial contextual data to determine updated contextual data describing the context of the user. Filler content personalized to the user is generated based on the updated contextual data describing the context of the user. The filler content is presented through a user interface during the first delay, responsive to detecting the first delay in the conversation system.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
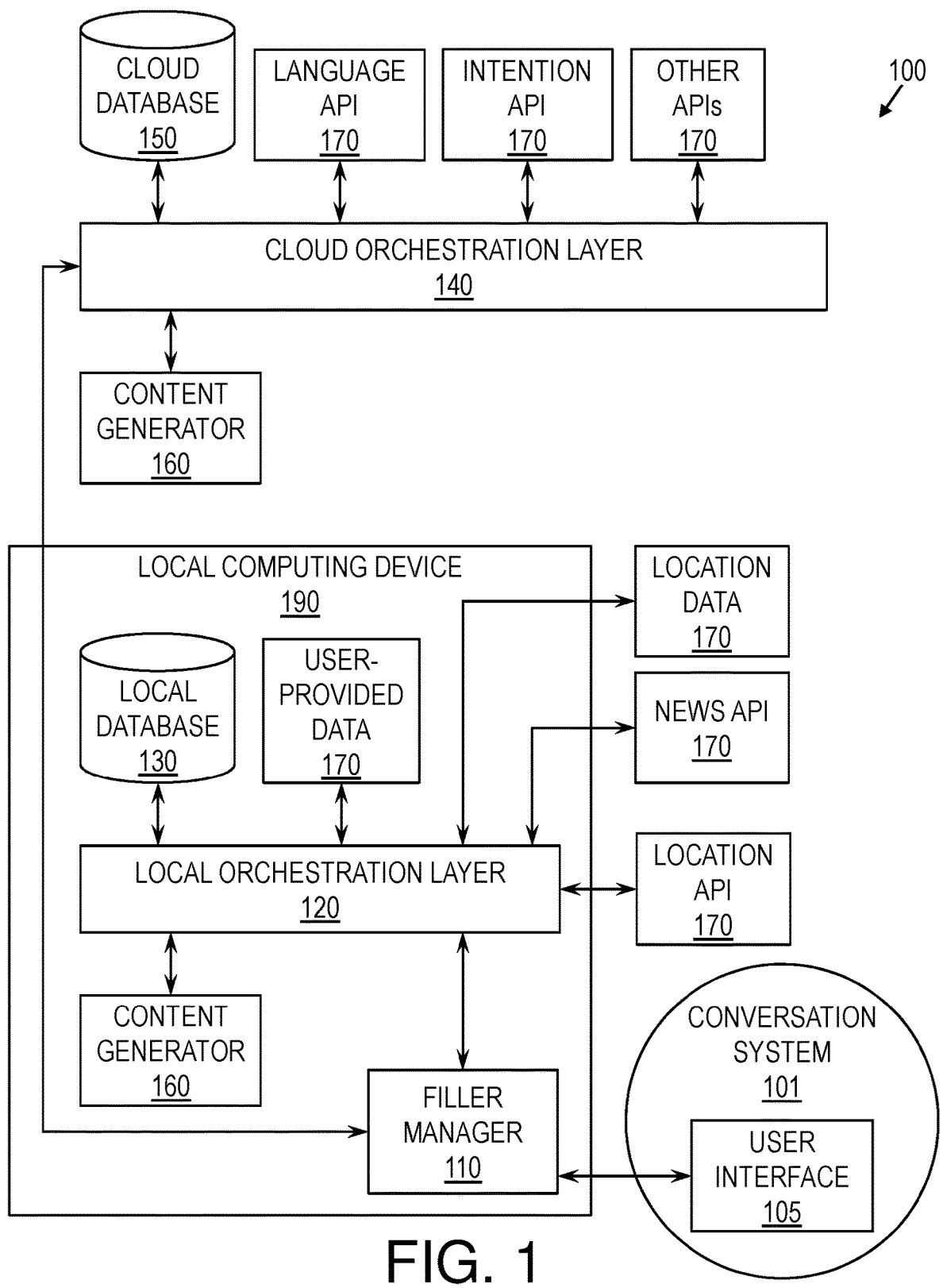
FIG. 1 is a diagram of a filler system for providing contextual filler in a conversation, according to some embodiments of this invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, a conversation system is an application, or combination of applications, that converses with a user in an automated fashion. Typically, a conversation system is an NLP system or utilizes an NLP system. Conversation systems are becoming more popular to provide immediate responses to users, especially in the field of customer service. Conversation systems are used in various applications and can be used in place of a human agent or prior to assigning a human agent, so as to maintain a high level of service to users. For instance, when a user contacts customer service via phone or web-based chat, a conversation system can interact with the user to determine the user's problem, so as to identify an appropriate customer service agent or to provide the user with a solution.

Conversation systems require various services to address a user query. Such services include the following, for example: voice-to-text analysis, searching of remote services, data analysis, and response formulation. Especially when combined together, these services and others can result in delays when a conversation system is responding to a user query. For a complex query, the delay can be significant, causing the user to wait while the query is processed by the conversation system.

Sometimes, a conversation system utilizes filler content to fill the space of a delay. Filler content is designed to give the impression that the system is actively working on the user's query and a response is imminent. For instance, filler content can include generic messages, such as "thinking" or "I am still working on that problem." The purpose of filler content is to assure a user that the conversation is still active and that the user's query will eventually be answered. However, this type of filler does not keep the user engaged and, as a result, can adversely impact user satisfaction. If the conversation system is used for customer service, adverse impact on user satisfaction can lead to lost business.

Turning now to an overview of the aspects of the invention, one or more embodiments of the invention address the above-described shortcomings of the prior art by providing an improved computer-based conversation system, such as an NLP system, configured and arranged to cognitively generate meaningful filler content that is relevant to the user. When it is determined that a delay will be sufficiently long, embodiments of the invention, utilize one or more orchestration layers to generate filler content, which may include questions or other filler. Specifically, embodiments of the invention include one or more orchestration layers that extract and consider contextual information about a user. A first orchestration layer may run in a cloud, while a second orchestration later may run on a local computing device with resource constraints, resulting in lower latency than the first orchestration layer, while a second orchestration layer may run in a cloud. Generally, an orchestration layer receives contextual data from the user, or from the local computing device. In some embodiments of the invention, the orchestration later communicates with external data sources, such as news sources or social media, to augment the contextual data received. Using the augmented contextual data, the orchestration layer may generate filler that is relevant to the user.

The above-described aspects of the invention address the shortcomings of the prior art by providing an improved computer-based conversation system, such as an NLP system, that automatically and cognitively provides meaningful filler content to maintain user engagement when the conversation system determines that significant time is required to resolve a complex query. By cognitively basing filler on contextual information specifically relevant to the user, embodiments of the invention can create a sense or personalization, which improves user engagement and satisfaction. Further, by including a local orchestration layer as well as a cloud-based orchestration layer, embodiments of the invention can automatically balance speed with complexity, such that the local orchestration layer can provide filler quickly while the cloud-based orchestration layer can generate questions based on more complex processing.

Turning now to a more detailed description of aspects of the present invention, FIG. 1 is a diagram of a filler system 100 for providing contextual filler in a conversation, according to some embodiments of this invention. As shown in FIG. 1, in some embodiments of the invention, the filler system 100 includes a filler manager 110, a local orchestration layer 120 and a local database 130 on a local computing device 190 of a user, a cloud orchestration layer 140 and a cloud database 150 running in a cloud, and one or more instances of a content generator 160. In some embodiments of the invention, a first content generator 160 runs in the cloud and is in communication with the cloud orchestration layer 140, while a second content generator 160 runs on the local computing device 190 and is in communication with the local orchestration layer 120. Generally, a user interacts with a conversation system 101 through a user interface 105, and the filler system 100 provides filler for that interaction when the conversation system's response time is expected to be slow, such as may be the case when the user has asked the conversation system 101 a complex query. The filler system 100 may thus be incorporated into or in communication with the conversation system 101.

The conversation system 101 may include one or more applications, which may or may not utilize artificial intelligence, and which together converse with the user. For example, and not by way of limitation, the conversation system 101 may be an automated voice system or automated text-based response system. The user interface 105 may be a chat window or a phone connection, for example, and responses made by the conversation system 101 may be text, voice, or other media. The filler manager 110 may be in communication with, or integrated into, the conversation system 101. Thus, the filler manager 110 is aware of the tasks being performed by the conversation system 101 to converse with the user. In some embodiments of the invention, the filler manager 110 behaves as a bridge between the conversation system 101 and the remainder of the filler system 100 as described herein.

Each orchestration layer, specifically the local orchestration layer 120 and the cloud orchestration layer 140, may communicate with one or more data sources 170 to determine contextual data relevant to the user. Each data source 170 may be, or may connect to, a source external to the filler system 100 to enable augmenting of contextual data. In some embodiments of the invention, one or more of the data sources 170 are remote from the filler system 100 or communicate with a remote resource. For example, and not by way of limitation, a data source 170 may be a locator device (e.g., a global positioning system (GPS) device), a social media account, another external account (e.g., on a travel website), a news source, or another external database or external web service. In some embodiments of the invention, one or more of the data sources 170 supported by the filler system 100 must be explicitly approved by the user before the filler system 100 uses them. For example, and not by way of limitation, when initializing interactions with the user, the filler manager 110 may prompt the user to indicate which supported data sources 170 should be used for this interaction and future interactions. In some embodiments of the invention, when contextual data related to the user is obtained from a data source 170, the applicable orchestration layer may add that contextual data to its respective database.

Each orchestration layer may be in communication with a respective set of data sources 170, from which the orchestration layer may extract additional contextual data about the user, as will be described further below. That additional contextual data may be added to the contextual data in the respective database of that orchestration layer. The local orchestration layer 120 may utilize a different set of data sources 170 than utilized by the cloud orchestration layer 140. Further, the set of data sources 170 utilized by the local orchestration layer 120 may be low latency. These sets of data sources 170 of the local orchestration layer 120 and the cloud orchestration layer 140 may, but need not, overlap.

As shown in the example of FIG. 1, the data sources 170 utilized by the local orchestration layer 120 may include one or more of the following, for example: user-provided data, such as information about interests, friends, and travel; location data, which may be accessed by a location device on the local computing device 190; a news application programming interface (API), which accesses a remote web server that provides news; a location API, which accesses information about events related to the user's location; or other APIs. As also shown in the example of FIG. 1, the data sources 170 utilized by the cloud orchestration layer 140 may include one or more of the following, for example: a language API, which accesses one or more services to perform natural language processing, language determination, or translation on existing contextual data or information provided by the user to the user interface 105; an intention API, which accesses one or more services to determine an intent of the user based on contextual data or information provided by the user to the user interface 105; or other APIs. It will be understood that the specific data sources 170 illustrated in FIG. 1 are shown for illustrative purposes only, and that additional or alternative data sources 170 may be used for each orchestration layer.

Generally, the local orchestration layer 120 may store contextual data in the local database 130, and the cloud orchestration layer 140 may store contextual data in the cloud database 150. In some embodiments of the invention, each of the local database 130 and the cloud database 150 includes one or more storage objects for maintaining data as described herein. For example, and not by way of limitation, each of the local database 130 and the cloud database 150 may be a relational database or portion thereof, one or more files, or one or more other storage objects. In some embodiments of the invention, the local orchestration layer 120 occasionally uploads contextual data in the local database 130 to the cloud database 150, such that the cloud database 150 may maintain contextual information gathered by both orchestration layers. Additionally or alternatively, the cloud orchestration layer 140 may occasionally download, to the local database 130, some or all contextual data in the cloud database 150.

When filler content is desired to be posed to a user, the filler manager 110 may direct the task of generating the filler content to one of the orchestration layers, either the local orchestration layer 120 or the cloud orchestration layer 140. The filler content may be generated based on contextual data known about the user. To generate the filler content, the applicable orchestration layer may select a topic based on contextual data from its respective database (i.e., the local database 130 if the orchestration layer is the local orchestration layer 120, the cloud database 150 if the orchestration layer is the cloud orchestration layer), its associated data sources 170, or a combination of both. The content generator 160 may then generate filler content based on the topic. The filler content may be, for instance, a question to be posed to the user. The applicable orchestration layer may then transmit the filler content to the filler manager 110, which may provide the filler content to the user interface 105.

Generally, when the filler manager 110 determines that filler content is needed, the filler manager 110 may direct the task of generating the filler content to one of the orchestration layers, either the local orchestration layer 120 or the cloud orchestration layer 140. The filler content may be generated based on contextual data known about the user. To generate the filler content, the applicable orchestration layer may select a topic based on contextual data from its respective database (i.e., the local database 130 if the orchestration layer is the local orchestration layer 120, the cloud database 150 if the orchestration layer is the cloud orchestration layer), its associated data sources 170, or a combination of both. The content generator 160 may then generate the filler content based on the topic. The filler content may be, for instance, a question to be posed to the user. The applicable orchestration layer may then transmit the filler content to the filler manager 110, which may provide the filler content to the user interface 105.

In some embodiments of the invention, the filler manager 110 selects which orchestration layer to use based on an estimated time until the conversation system 101 provides a response to an outstanding user query. More specifically, if the estimated time meets (e.g., equals or exceeds) an established time threshold, then the filler manager 110 may direct the cloud orchestration layer 140 to generate the question, and if the estimated time does not meet the time threshold, then the filler manager 110 may direct the local orchestration layer 120 to generate the question. The time threshold may be system defined or user defined, for example, and the time threshold may be dynamic. For example, and not by way of limitation, if the user is recognized (e.g., based on the IP address of the user, or based on a user account of the user), then the filler system's history with the user may, at least in part, determine the value of the time threshold. For instance, if the user previously disconnected his or her conversation with the conversation system 101 without allowing the conversation system 101 to complete a task, then the time threshold may be lowered from its prior value associated with the user.

In some embodiments of the invention, the filler manager 110 receives contextual data and passes that contextual data to the selected orchestration layer upon determining that filler content is needed. This contextual data may be received by the filler manager 110 at the local computing device 190, such as by being entered by the user into the user interface 105 or by being detected by the local computing device 190 and passed to the filler manager 110. The contextual data may include initialization data, which need be provided by the user only once to initialize interactions between the user and the filler system 100. Initialization data may include, for example, login information for external accounts (e.g., social media) or preferences about filler topics. For example, and not by way of limitation, the user can link the filler system 100 to one or more external accounts, such as social media accounts, or can provide authentication information enabling the filler system 100 to log into one or more accounts. In some embodiments of the invention, access to an external account of the user need only be provided once to the filler system 100, as an initialization activity. Other contextual data provided by the user or the local computing device 190 may include, for example, a location of the local computing device 190.

When the cloud orchestration layer 140 is selected by the filler manager 110, the cloud orchestration layer 140 may access one or more connected data sources 170 to augment the contextual data known about the user. For instance, given access to a social media account, the cloud orchestration layer 140 may determine which events, organizations, athletic teams, or artists the user has liked or interacted with; determine which topics the user discusses; or obtain information about the user gathered by the social media network.

Given known contextual data, the cloud orchestration layer 140 may search the data sources 170 for additional information that is relevant (e.g., includes common terms, or relates to the user's location) to the contextual data already known about the user. Thus, the cloud orchestration layer 140 may expand the contextual data through use of the data sources 170. The cloud orchestration layer 140 may add the contextual data, including both the contextual data provided by the user any additional contextual data determined, to the cloud database 150. Further, in some embodiments of the invention, the cloud orchestration layer 140 may update the contextual data from time to time, for instance, each time filler content is being generated.

When the cloud orchestration layer 140 is directed to generate filler content, the cloud orchestration layer 140 may base that filler content on the contextual data, which may be extracted from the cloud database 150. More specifically, a topic may be selected from the contextual data. Selection of the topic may be performed in various ways. For example, and not by way of limitation, a term that appears frequently in the contextual data and has not been used previously as a topic for the user may be selected as the topic. For another example, a set of terms appearing a threshold number of times in the contextual data may be selected as potential topics, and one term in the set may be selected at random as the topic. The selected topic may then be inputted into the content generator 160 as a query.

In some embodiments of the invention, the local orchestration layer 120 resides on the local computing device 190 of the user, such as a mobile phone or a personal computer. For instance, the local orchestration layer 120 may be implemented as software, such as a script or a program, running locally. Alternatively, however, the local orchestration layer 120 may be implemented as a specialized hardware circuit or a combination of hardware and software. Analogously, the local database 130 may be maintained on the local computing device 190 as well. Generally, the local orchestration layer 120 and associated local database 130 may be used when the filler manager 110 seeks for a question to be generated relatively quickly (e.g., within a threshold timeframe), when the local orchestration layer 120 is offline, or to refine filler content generated at the cloud orchestration layer 140.

The local orchestration layer 120 may be a simplified version of the cloud orchestration layer 140 and may thus be lighter weight than the cloud orchestration layer 140. For instance, the data sources 170 used by the local orchestration layer 120 may be low latency, compared to the data sources 170 used by the cloud orchestration layer. For instance, each such data source 170 may be expected to provide a query response within an established response time. In some embodiments of the invention, the data sources 170 for each orchestration layer are preselected, such as by an administrator or developers, and preselection may be based at least in part on expected latency.

Analogously to the cloud orchestration layer 140, the local orchestration layer 120 may receive contextual data from the filler manager 110 or may extract contextual data from the local database 130, or both. The local orchestration layer 120 may expand the known contextual data based on the data sources 170. The local orchestration layer 120 may store newly determined in the contextual data in the local database 130. When the local orchestration layer 120 is directed to generate filler content, the local orchestration layer 120 may base that question on the contextual data in the local database 130. As discussed above, various mechanisms may be used to select a topic from the contextual data.

Further, in some embodiments of the invention, contextual data may be transmitted from the local database 130 to the cloud database 150 or from the cloud database 150 to the local database 130 to ensure that both the local orchestration layer 120 and the cloud orchestration layer 140 have access to contextual data enabling each orchestration layer to generate filler content as needed. In some embodiments of the invention, the local orchestration layer 120 may be assigned a first subset of topics deemed to require low latency with respect to generation of filler content. In that case, the cloud orchestration layer 140 may transfer from the cloud database 150 to the local database 130 contextual data related to such topics, and the local orchestration layer 120 may transfer to the cloud database 150 contextual data deemed related to other topics.

As discussed above, after the filler manager 110 selects an orchestration layer, that orchestration layer may determine contextual data, by accessing its respective database or one or more data sources 170, or a combination of both. Based on the contextual data, the orchestration layer may select a topic. The topic may be provided to the content generator 160 as a filler query. In some embodiments of the invention, the content generator 160 utilizes a rules-based model or a neural conversation model, or both, to generate filler content, which may be a question posed to the user or other content that may be designed to prompt a reply from the user.

In some embodiments of the invention, the content generator 160 is lightweight, to filler content to be generated while the user waits for a reply from the conversation system 101. In some embodiments of the invention, to determine which mechanism (e.g., a rules-based model or a neural conversation mode) to use to generate filler content, the content generator 160 determines whether the filler query is complex or simple. Whether a filler query is classified as simple may be a rules-based decision, where an applicable set of rules may be established based on prior decisions about what types of queries are simple and which are complex. These prior decisions may be made by a developer or by subject-matter experts, for example. If application of the rules indicates that a filler query is simple, then the filler query may be deemed simple. However, of the filler query is not deemed simple, the filler query may be deemed complex.

The content generator 160 may invoke a rules-based model for a filler query deemed to be simple. In some embodiments of the invention, the rules-based model takes the filler query as input and applies one or more rules to determine filler content. These rules may consider, for example, the filler query itself, a history with the user, and the contextual data in the applicable database. In some embodiments of the invention, the rules are crafted in advance by subject-matter experts for the various topics deemed to be simple. In other words, for instance, the content generator 160 may use one or more rules to determine whether the filler query is simple and, if the filler query is simple, may use an additional set of one or more rules to determine filler content.

For a complex query, the content generator 160 may use a neural conversation model. The neural conversation model may be trained in advance using a large set of single-turn dialogues, which can be sourced from chat logs or past conversations in the conversation system 101. In some embodiments of the invention, the neural conversation model is based on a seq2seq deep learning model that is an encoder-decoder network including two recurrent neural networks chained together. A recurrent neural network (RNN) is a time sequence model that takes an arbitrary input, converts the input into a vector of numbers, and combines the result with its previous state (e.g., another vector of numbers) to produce a new state (e.g., yet another vector of numbers). In embodiments of the invention, the encoder is an RNN that takes the filler query as input, where the filler query is one or more words in a sequence. For example, and not by way of limitation, the filler query may be an event of athletic team deemed to be relevant to the user. The encoder RNN may encode the filler query to produce its final state after processing all the words in the filler query.

In some embodiments of the invention, a decoder RNN is conditioned on one or more potential queries prior to being placed in operation. The decoder RNN takes the final state produced by the encoder as its initial state, and the decoder RNN generates one word at a time to create the filler content. While decoding to generate a response, the decoder RNN may incorporate additional contextual data related to the user. The resulting response may be the filler content to be presented to the user.

Thus, in some embodiments of the invention, the curation of filler content is performed automatically by way of a combination of machine learning and one or more rules-based model. Further, in some embodiments of the invention, the filler system 100 remains active in the background while the user interacts with the conversation system 101 and interacts with the user only when a delay is expected in a response from the conversation system 101, as described further below.

Figure 2:
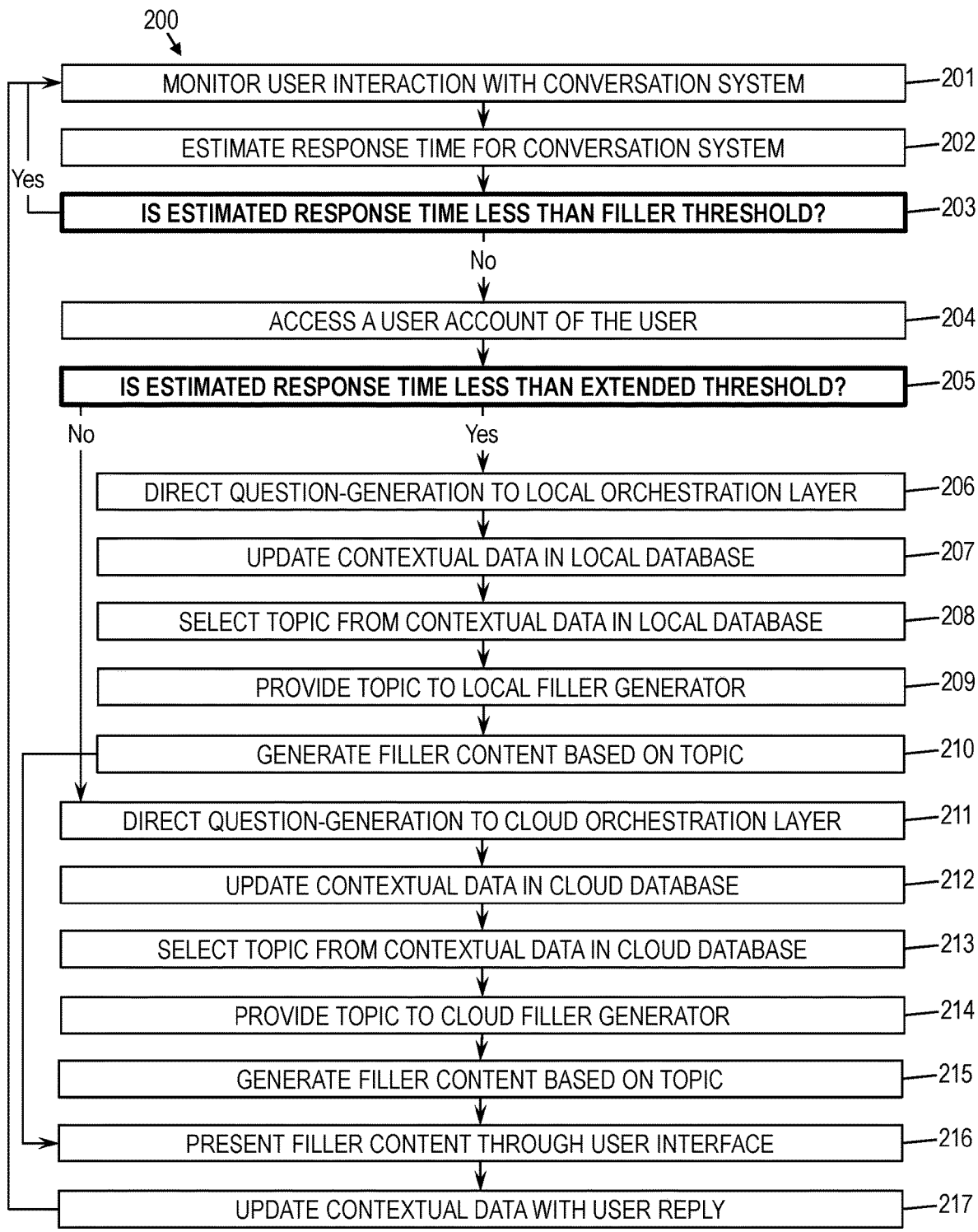
FIG. 2 is a flow diagram of a method of providing contextual filler, according to some embodiments of this invention.

FIG. 2 is a flow diagram of a method 200 of providing contextual filler, according to some embodiments of this invention. As shown in FIG. 2, at block 201, the user interacts with the conversation system 101 in a conversation while the filler manager 110 monitors the conversation in the background. At block 202, each time the conversation system 101 begins preparing a response to a user query posed by the user, the filler manager 110 estimates a response time for the conversation system 101. This determination may be made in various manners, such as, for instance, based on historical response times of the conversation system 101 for similar user queries.

At decision block 203, the filler manager 110 determines whether the estimated response time is less than a filler threshold. If the estimated response time is less than the filler threshold, then the filler manager 110 may decide not to provide filler content at this time, because the response is expected to come back quickly. In this case, the method 200 returns to block 201, where the user continues interacting with the conversation system 101.

However, if the estimated response time meets (e.g., equals or exceeds) the filler threshold, then the filler manager 110 may begin the process of generating filler content. To this end, at block 204, the filler manager 110 may access a user account of the user on the filler system 100 or, if needed, may initialize such an account.

In some embodiments of the invention, the user need not establish login credentials for his or her account with the filler system 100. Rather, for example, the filler system 100 may be associated with an existing account of the user, through which the user is interacting with the conversation system 101, and this existing account may be used by the filler system 100. For another example, the filler system 100 may establish the user account based on an identifier of the user's local computing device 190, such as an Internet Protocol (IP) address or a Media Access Control (MAC) address. Thus, upon recognizing the local computing device 190 or the account in use by the user, the filler system 100 may access the user's account with the filler system 100 to recognize the contextual data already associated with the user.

If the filler manager 110 determines that the user does not have an account with the filler system 100, then the filler manager 110 may prompt the user to provide contextual data, including initialization data. This prompting and the provision of initialization data may occur through the user interface 105, for instance. The initialization data may include, for example: access permissions for one or more external accounts (e.g., social media) of the user, permission to access location data of the local computing device 190, preferred topics of discussion, or other contextual data about the user. The contextual data provided may be stored in the local database 130 or the cloud database 150, or both. For instance, after the filler manager 110 selects an orchestration later to generate filler content, the contextual data may be initially stored in the respective database of that orchestration layer.

At decision block 205, the filler manager 110 may determine whether the estimated response time is less than an extended threshold, which is greater than the filler threshold. If the estimated response time is less than the extended threshold, then the filler manager 110 directs question-generation to the local orchestration layer 120 at block 206.

At block 207, the local orchestration layer 120 updates the contextual data in the local database 130. This may be performed, for example, by adding to the local database 130 any contextual data provided by the user to the user interface 105. For another example, the local orchestration layer 120 may update the contextual data by querying the data sources 170 with contextual data to augment the contextual data in the local database 130 or received from the user with additional information. For example, and not by way of limitation, the user's current location may be obtained from a location device on the local computing device 190, and a news API may be queried with that location to determine events or news occurrences proximate the location. The information gathered may be added to the contextual data in the local database 130 to update that contextual data.

At block 208, the local orchestration layer 120 selects a topic from the contextual data in the local database 130. At block 209, the selected topic is provided to the local content generator 160 as a filler query. At block 210, the content generator 160 generates filler content based on the topic and transmits the filler content to the filler manager 110. The method 200 then skips ahead to block 216.

However, if the estimated response time meets the extended threshold back at decision block 205, then the filler manager 110 directs question-generation to the cloud orchestration layer 140 at block 211.

At block 212, the cloud orchestration layer 140 updates the contextual data in the cloud database 150. This may be performed, for example, by adding to the cloud database 150 any contextual data provided by the user. For another example, the cloud orchestration layer 140 may update the contextual data by querying the data sources 170 with contextual data to augment the contextual data with additional information. For example, and not by way of limitation, given a statement on the user's social media, an intent API may be queried to determine an intention of that statement, which may be added to the contextual data in the cloud database 150 to update that contextual data.

At block 213, the cloud orchestration layer 140 selects a topic from the contextual data in the cloud database 150. At block 214, the selected topic is provided to the cloud content generator 160 as a filler query. At block 215, the content generator 160 generates filler content based on the topic and transmits the filler content to the filler manager 110.

At block 216, upon receiving filler content from either the local orchestration layer 120 or the cloud orchestration layer 140, the filler manager 110 presents the filler content to the user through the user interface 105. The filler manager 110 may then wait for the user's reply, which may be received through the user interface 105. When received, the user's reply to the filler content may be added to the contextual data about the user at block 217. The method 200 may then return to block 201, where the filler manager 110 continues monitoring the conversation in the background until the conversation system's estimated response time once again meets the filler threshold. For instance, if the conversation system 101 has not yet responded to the user query, the filler manager 110 may recalculate the estimated response time and thereby determine whether to generate additional filler content.

Figure 3:
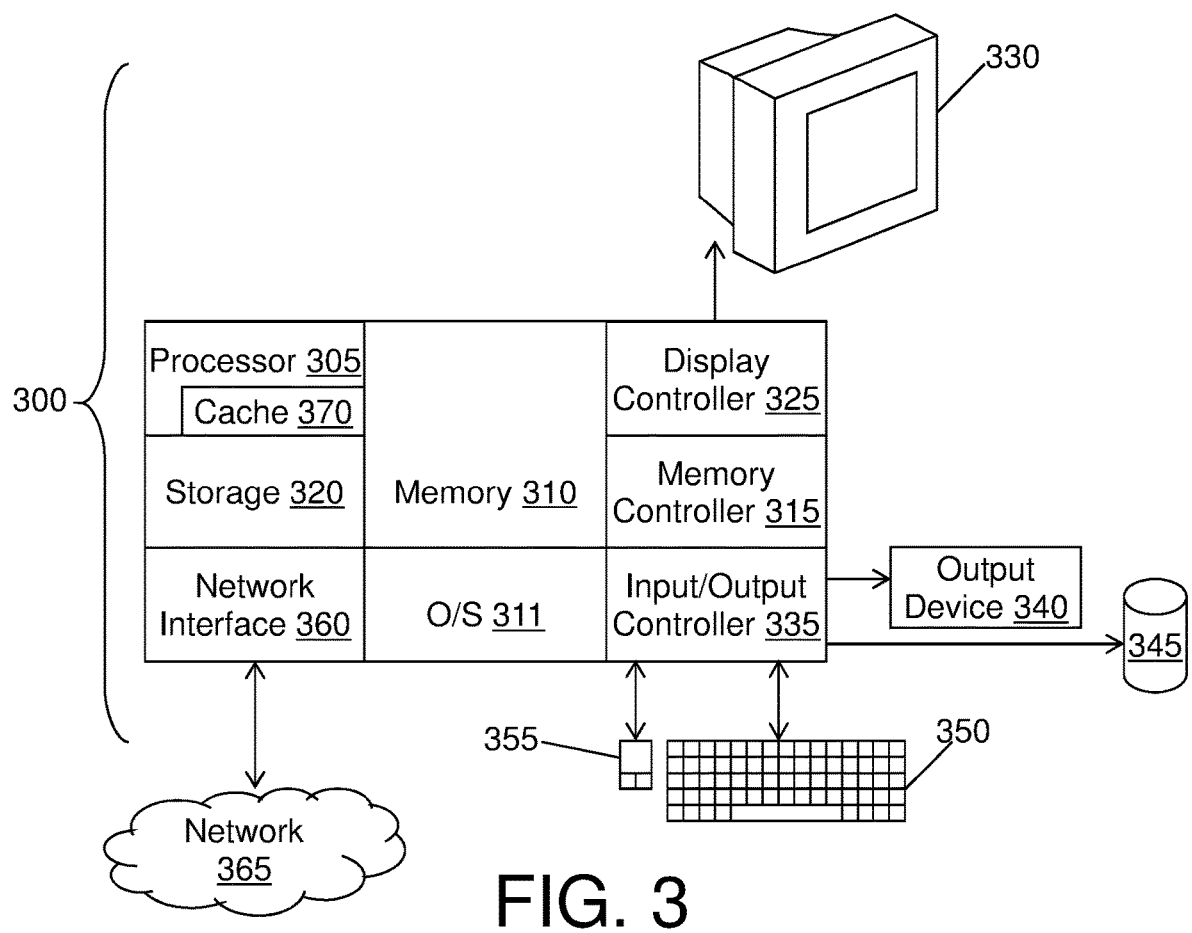
FIG. 3 is a block diagram of a computer system for implementing some or all aspects of the filler system, according to some embodiments of this invention.

FIG. 3 is a block diagram of a computer system 300 for implementing some or all aspects of the filler system 100, according to some embodiments of this invention. The filler systems 100 and methods described herein may be implemented in hardware, software (e.g., firmware), or a combination thereof. In some embodiments, the methods described may be implemented, at least in part, in hardware and may be part of the microprocessor of a special or general-purpose computer system 300, such as a personal computer, workstation, minicomputer, or mainframe computer. For example, and not by way of limitation, the local computing device 190 may be a computer system 300, and each orchestration layer may include one or more computer systems 300 or portions thereof.

In some embodiments, as shown in FIG. 3, the computer system 300 includes a processor 305, memory 310 coupled to a memory controller 315, and one or more input devices 345 and/or output devices 340, such as peripherals, that are communicatively coupled via a local I/O controller 335. These devices 340 and 345 may include, for example, a printer, a scanner, a microphone, and the like. Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be a custom made or commercially available processor, a central processing unit (CPU), an auxiliary processor among several processors associated with the computer system 300, a semiconductor-based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.).

The memory 310 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid-state drive. The stored instructions in memory 310 or in storage 320 may include those enabling the processor to execute one or more aspects of the filler systems 100 and methods of this disclosure.

The computer system 300 may further include a display controller 325 coupled to a display 330. In some embodiments, the computer system 300 may further include a network interface 360 for coupling to a network 365. The network 365 may be an IP-based network for communication between the computer system 300 and an external server, client and the like via a broadband connection. The network 365 transmits and receives data between the computer system 300 and external systems. In some embodiments, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Filler systems 100 and methods according to this disclosure may be embodied, in whole or in part, in computer program products or in computer systems 300, such as that illustrated in FIG. 3.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
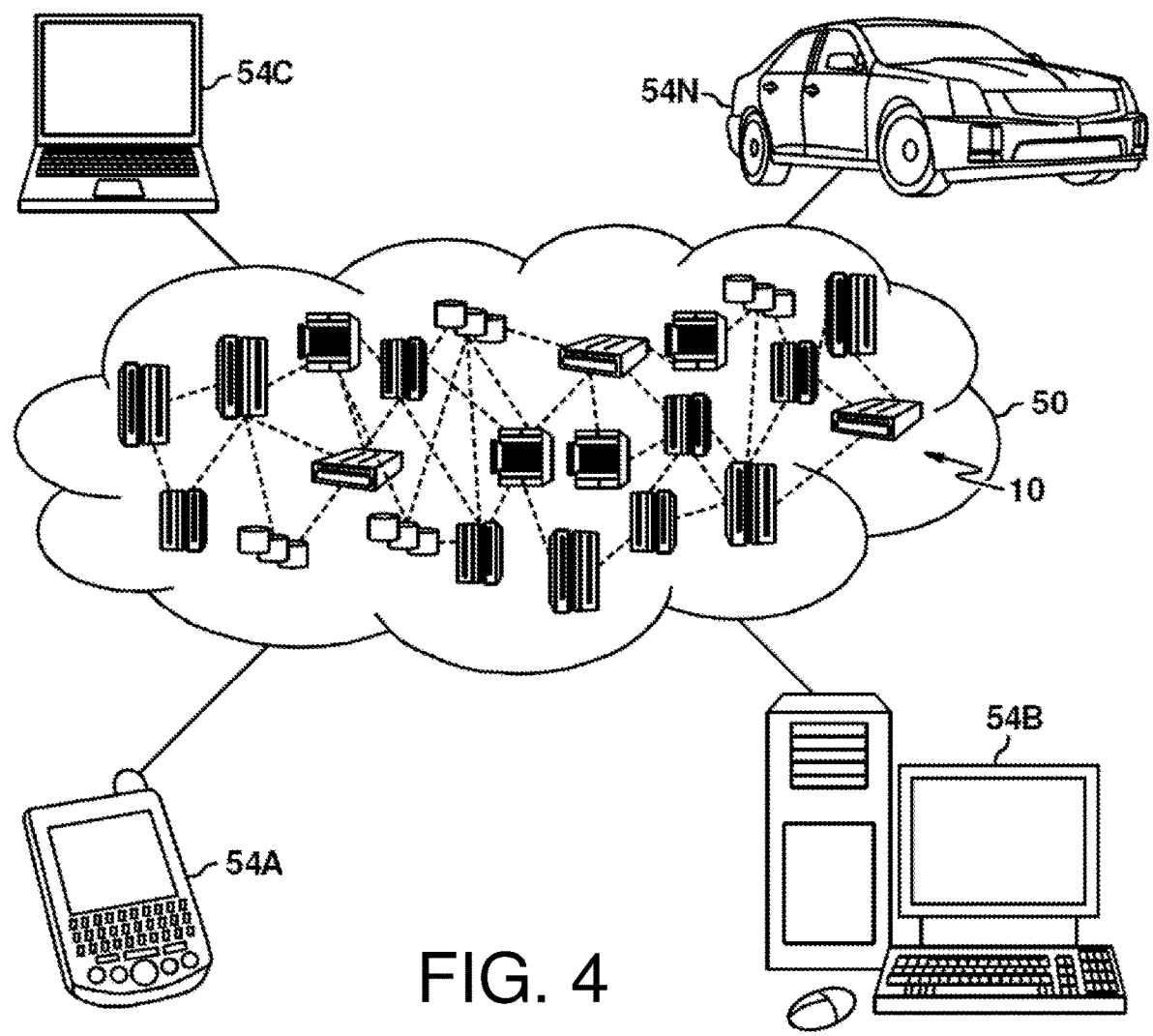
FIG. 4 is a block diagram of a cloud computing environment, according to some embodiments of this invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
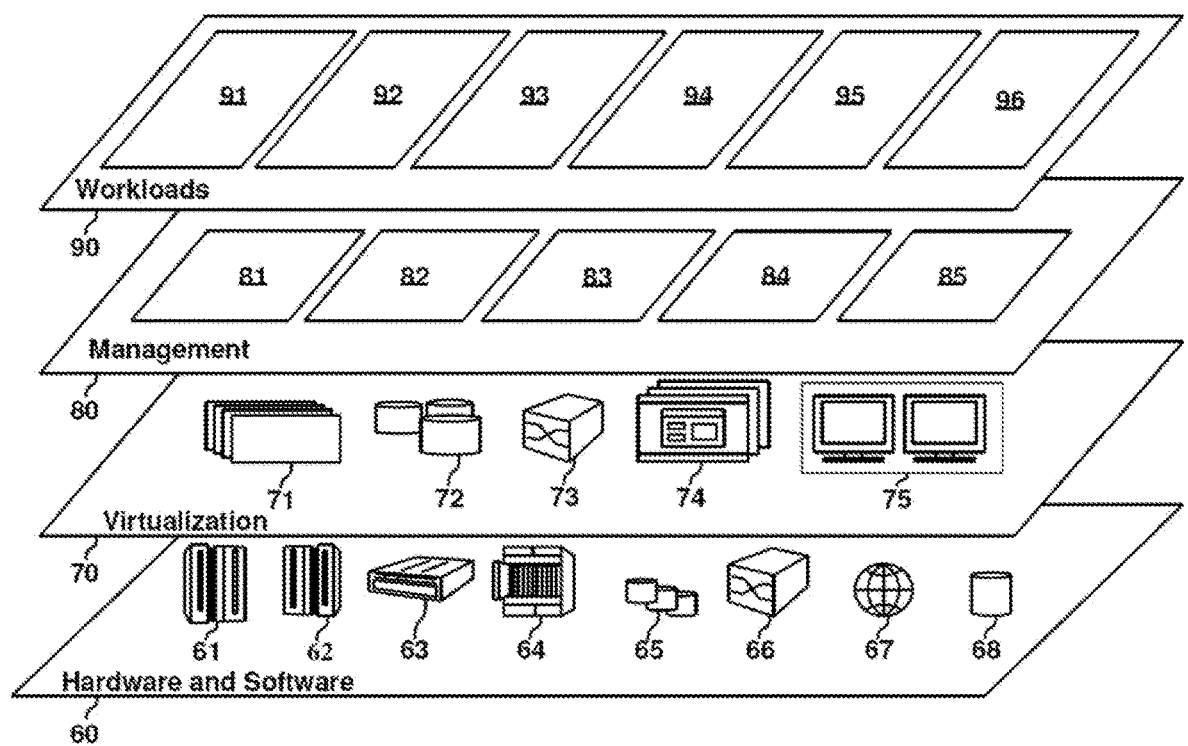
FIG. 5 is a block diagram of abstraction model layers, according to some embodiments of this invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and tasks performed by the cloud orchestration layer 140 and the associated content generator 160 as described herein 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   detecting, using a processor system, a first delay in a conversation system;
   estimating a length of the first delay;
   in response to the first delay being below a predetermined threshold, selecting a first orchestration layer to generate filler content, the first orchestration layer operated locally by the processor system, wherein generating the filler content by the first orchestration layer comprises:
      receiving, at the first orchestration layer of the processor system, initial contextual data, wherein the initial contextual data describes a context of a user;
      querying, by the first orchestration layer, a first data source that is stored locally on the processor system, based on the initial contextual data;
      augmenting, by the first orchestration layer, the initial contextual data to determine updated contextual data describing the context of the user, based on querying the first data source; and
      generating the filler content personalized to the user, based on the updated contextual data describing the context of the user;
   in response to the first delay not being below the predetermined threshold, selecting a second orchestration layer to generate the filler content, the second orchestration layer operated remotely on a cloud platform, wherein generating the filler content by the second orchestration layer comprises:
   receiving, at the second orchestration layer, the initial contextual data;
      querying, by the second orchestration layer, a second data source that is stored remotely, based on the initial contextual data;
      augmenting, by the second orchestration layer, the initial contextual data to determine the updated contextual data describing the context of the user, based on querying the first data source; and generating the filler content personalized to the user based on the updated contextual data describing the context of the user; and storing the filler content and the updated contextual data in the first data source that is stored locally on the processor system; and presenting the filler content through a user interface during the first delay, responsive to detecting the first delay in the conversation system.

2. The computer-implemented method of claim 1, further comprising:
determining, by the second orchestration layer, additional contextual data describing the context of the user; and
storing, by the second orchestration layer, the additional contextual data in a cloud database.

3. The computer-implemented method of claim 1, wherein generating the filler content personalized to the user based on the updated contextual data describing the context of the user comprises:
selecting a topic from the updated contextual data; and
generating the filler content based on the topic.

4. The computer-implemented method of claim 3, wherein generating the filler content based on the topic comprises applying at least one of a neural conversation model and a rules-based model to generate the filler content based on the topic.

5. The computer-implemented method of claim 1, wherein:
the initial contextual data comprises a location of the user; and
augmenting the initial contextual data to determine the updated contextual data describing the context of the user comprises determining at least one of an event related to the location and an organization related to the location.

6. The computer-implemented method of claim 1, wherein querying the first data source based on the initial contextual data comprises querying a remote resource through an application programming interface.

7. A conversation system comprising:
a memory device; and
one or more processors coupled with the memory device, the one or more processors configured to operate a filler manager that is configured to:
detect a first delay in the conversation system, and estimate a length of the first delay;
in response to the first delay being below a predetermined threshold, select a first orchestration layer to generate filler content, the first orchestration layer operated locally, wherein the first orchestration layer is configured to:
receive initial contextual data, wherein the initial contextual data describes a context of a user;
query a first data source based on the initial contextual data that is stored locally; and
augment the initial contextual data to determine updated contextual data describing the context of the user, based on querying the first data source; and
a content generator configured to generate the filler content personalized to the user, based on the updated contextual data describing the context of the user;
in response to the first delay not being below the predetermined threshold, select a second orchestration layer to generate the filler content, the second orchestration layer operated remotely on a cloud platform, wherein the second orchestration layer is configured to:
receive the initial contextual data;
query a second data source that is stored remotely, based on the initial contextual data;
augment the initial contextual data to determine the updated contextual data describing the context of the user, based on querying the first data source; and
generate the filler content personalized to the user based on the updated contextual data describing the context of the user; and
store the filler content and the updated contextual data in the first data source that is stored locally;
wherein the filler manager is further configured to present the filler content through a user interface during the first delay, responsive to detecting the first delay in the conversation system.

8. The system of claim 7, wherein:
the second orchestration layer is further configured to:
determine additional contextual data describing the context of the user; and
store the additional contextual data in a cloud database.

9. The system of claim 7, wherein, to generate the filler content personalized to the user based on the updated contextual data describing the context of the user, the first orchestration layer is further configured to:
select a topic from the updated contextual data; and
generate the filler content based on the topic.

10. The system of claim 9, wherein, to generate the filler content based on the topic, the first orchestration layer is further configured to apply at least one of a neural conversation model and a rules-based model to generate the filler content based on the topic.

11. A computer-program product for generating contextual filler content, the computer-program product comprising a computer-readable storage medium having program instructions embodied therewith, the program instructions executable by a processor to cause the processor to perform a method comprising:
detecting a first delay in a conversation system;
estimating a length of the first delay;
in response to the first delay being below a predetermined threshold, selecting a first orchestration layer to generate filler content, the first orchestration layer operated locally by the processor system, wherein generating the filler content by the first orchestration layer comprises:
receiving, at the first orchestration layer, initial contextual data, wherein the initial contextual data describes a context of a user;
querying, by the first orchestration layer, a first data source that is stored locally on the processor system based on the initial contextual data;
augmenting, by the first orchestration layer, the initial contextual data to determine updated contextual data describing the context of the user, based on querying the first data source; and
generating the filler content personalized to the user, based on the updated contextual data describing the context of the user; and
in response to the first delay not being below the predetermined threshold, selecting a second orchestration layer to generate the filler content, the second orchestration layer operated remotely on a cloud platform, wherein generating the filler content by the second orchestration layer comprises:
  receiving, at the second orchestration layer, the initial contextual data;
  querying, by the second orchestration layer, a second data source that is stored remotely, based on the initial contextual data;
  augmenting, by the second orchestration layer, the initial contextual data to determine the updated contextual data describing the context of the user, based on querying the first data source; and
  generating the filler content personalized to the user based on the updated contextual data describing the context of the user;
  storing the filler content and the updated contextual data in the first data source that is stored locally on the processor system; and
presenting the filler content through a user interface during the first delay, responsive to detecting the first delay in the conversation system.

12. The computer-program product of claim 11, the method performed by the processor further comprising:
  determining, by the second orchestration layer, additional contextual data describing the context of the user; and
  storing, by the second orchestration layer, the additional contextual data in a cloud database.

13. The computer-program product of claim 11, wherein generating the filler content personalized to the user based on the updated contextual data describing the context of the user comprises:
  selecting a topic from the updated contextual data; and
  generating the filler content based on the topic.

14. The computer-program product of claim 13, wherein generating the filler content based on the topic comprises applying at least one of a neural conversation model and a rules-based model to generate the filler content based on the topic.

* * * * *